（12） United States Patent
Fuchs et al.

(10) Patent No.: US 10,495,105 B2
(45) Date of Patent: Dec. 3, 2019

(54) DIFFUSER OF A THERMAL ENERGY MACHINE AND THERMAL ENERGY MACHINE

(71) Applicant: Siemens Aktiengesellschaft, Munich (DE)

(72) Inventors: Florian Fuchs, Berlin (DE); Martin Hecklau, Berlin (DE); Nils Herzog, Berlin (DE); Philippos Theodoros Mavrommatis, Berlin (DE); Stefan Mutke, Berlin (DE); Julia Mühl, Berlin (DE); Matthias Pruss, Berlin-Lichtenberg (DE); Rafael Reckert, Berlin (DE); Julian Speiser, Berlin (DE); Rene Wohltat, Werder (DE)

(73) Assignee: Siemens Aktiengesellschaft, Munich (DE)

( * ) Notice: Subject to any disclaimer, the term of this patent is extended or adjusted under 35 U.S.C. 154(b) by 200 days.

(21) Appl. No.: 15/526,366

(22) PCT Filed: Nov. 19, 2015

(86) PCT No.: PCT/EP2015/077051
§ 371 (c)(1),
(2) Date: May 12, 2017

(87) PCT Pub. No.: WO2016/079221
PCT Pub. Date: May 26, 2016

(65) Prior Publication Data
US 2017/0314574 A1 Nov. 2, 2017

(30) Foreign Application Priority Data

Nov. 20, 2014 (EP) ..................... 14194073

(51) Int. Cl.
*F04D 29/54* (2006.01)
*F01D 9/02* (2006.01)
(Continued)

(52) U.S. Cl.
CPC ............. *F04D 29/542* (2013.01); *F01D 9/02* (2013.01); *F02C 3/14* (2013.01); *F04D 29/4246* (2013.01);
(Continued)

(58) Field of Classification Search
None
See application file for complete search history.

(56) References Cited

U.S. PATENT DOCUMENTS 4,718,819 A 1/1988 Rogo et al.
5,592,820 A 1/1997 Alary et al.
(Continued)

FOREIGN PATENT DOCUMENTS

EP 0628728 A1 12/1994
EP 0651207 A1 5/1995
(Continued)

OTHER PUBLICATIONS

EP Search Report dated May 11, 2015, for EP patent application No. 14194073.4.
(Continued)

*Primary Examiner* — Todd E Manahan
*Assistant Examiner* — Rodolphe Andre Chabreyrie
(74) *Attorney, Agent, or Firm* — Beusse Wolter Sanks & Maire

(57) ABSTRACT

A diffuser of a thermal energy machine, in particular of a gas turbine, has a diffuser inlet, a diffuser outlet, and a plurality of air-guiding elements, wherein an air mass flow enters the diffuser through the diffuser inlet, and wherein the air mass flow that has entered the diffuser exits the diffuser through (Continued)

the diffuser outlet and flows off as a plurality of partial air mass flows by the air-guiding elements. At least two immediately adjacent air-guiding elements of the plurality of air-guiding elements are designed in such a way that the flow-off angles thereof with respect to the circumferential surface formed by the outlet opening of the diffuser outlet extending circumferentially in the circumferential direction differ from each other.

9 Claims, 1 Drawing Sheet

(51) Int. Cl.
*F23R 3/04* (2006.01)
*F04D 29/42* (2006.01)
*F04D 29/44* (2006.01)
*F02C 3/14* (2006.01)
*F23R 3/42* (2006.01)
*F04D 19/02* (2006.01)

(52) U.S. Cl.
CPC .............. *F04D 29/444* (2013.01); *F23R 3/04* (2013.01); *F23R 3/42* (2013.01); *F04D 19/02* (2013.01); *F05D 2220/32* (2013.01); *F05D 2240/12* (2013.01); *F05D 2240/128* (2013.01); *F05D 2240/35* (2013.01); *F05D 2250/37* (2013.01)

(56) References Cited

U.S. PATENT DOCUMENTS

| | | | |
|---|---|---|---|
| 5,592,821 A | 1/1997 | Alary et al. | |
| 8,602,728 B2 * | 12/2013 | Swiatek | F04D 29/444 415/194 |
| 2002/0083372 A1 * | 6/2002 | Adam | G05B 23/0248 714/37 |
| 2004/0197187 A1 * | 10/2004 | Usab, Jr. | F01D 5/142 415/1 |
| 2005/0232762 A1 * | 10/2005 | Smoke | F01D 9/026 415/206 |
| 2007/0271923 A1 | 11/2007 | Dawson | |
| 2012/0315131 A1 * | 12/2012 | Mertens | F04D 27/0215 415/169.1 |
| 2014/0271168 A1 * | 9/2014 | Lopez-Parra | F01D 25/30 415/207 |

FOREIGN PATENT DOCUMENTS

| | | |
|---|---|---|
| FR | 1037610 A | 9/1953 |
| GB | 657366 A | 9/1951 |

OTHER PUBLICATIONS

International Search Report dated Jan. 5, 2016, for PCT/EP2015/077051.
IPER with Annex (PCT/IPEA/416 and 409) dated Mar. 17, 2017, for PCT/EP2015/077051.

* cited by examiner

DIFFUSER OF A THERMAL ENERGY MACHINE AND THERMAL ENERGY MACHINE

CROSS REFERENCE TO RELATED APPLICATIONS

This application is the US National Stage of International Application No. PCT/EP2015/077051 filed Nov. 19, 2015, and claims the benefit thereof. The International Application claims the benefit of European Application No. EP14194073 filed Nov. 20, 2014. All of the applications are incorporated by reference herein in their entirety.

FIELD OF INVENTION

The invention relates to a diffuser of a thermal energy machine, in particular of a gas turbine, with a diffuser inlet, with a diffuser outlet and with a multiplicity of air guiding elements, in which an air mass flow enters the diffuser through the diffuser inlet, and in which the air mass flow that has entered the diffuser leaves the diffuser via the diffuser outlet, and in so doing issues via the air guiding elements as a multiplicity of air mass partial flows.

The invention also relates to a thermal energy machine, in particular a gas turbine, with a compressor for compressing an air mass flow flowing in the axial flow direction along the machine longitudinal central axis, with a diffuser axially downstream of this compressor, and with two mutually opposite silo combustion chambers that are arranged radially further outward, in which a diffuser outlet region formed by a casing of the thermal energy machine discharges radially into the supply ducts leading to the silo combustion chambers such that the air mass flow leaving the diffuser can flow into the supply ducts via the diffuser outlet region.

BACKGROUND OF INVENTION

Generic diffusers, especially downstream of a compressor of a turbine, are well known from the prior art. The aerodynamic properties of these diffusers are influenced essentially by the contours of the inner and outer shell of the diffuser and by air guiding plates at a diffuser outlet, but also in particular by the guide vane row of the last compressor stage of an upstream compressor.

An essentially radial flow direction of the air mass flow induces, among other things, a secondary flow with a flow component in the radial direction, which can lead to critical blocking of the air mass flow within the diffuser and thus also to increased flow losses with regard to the air mass flow. Partial flow separations can also arise, which can lead to a severe reduction in the deceleration of the air mass flow at the diffuser, and accordingly also to a reduced static pressure at the diffuser outlet.

It is also known, from EP 0 628 728 A1, to arrange a so-called split diffuser between the compressor and an annular combustion chamber of a gas turbine, in order to supply the compressed air to a combustion chamber plenum with low losses. In that context, the split diffuser contains, on the outlet side, swirl-reduction vanes with identical outflow profiles, such that individual air streams leave with the same swirl. According to EP 0 651 207 A1, the segmentation of the outflow in the circumferential direction can also be brought about by means of individual rectangular ducts whose respective outlet openings are at different radii. According to FR 1 037 610, it is also possible for swirl-reduction vanes to be provided on the diffuser inlet side.

Overall, however, diffusers of this type are suitable only for use in a gas turbine with silo combustion chambers.

Furthermore, US 2007/0271923 A1 discloses a gas turbine in which guide elements are provided in order to reduce the flow losses between the diffuser outlet and the combustion chamber inlet. However, these appear to be attached in a manner which is both complex and associated with aerodynamic losses.

SUMMARY OF INVENTION

The invention has an object, in particular of overcoming the above-mentioned drawbacks, and also of increasing the aerodynamic efficiency of generic diffusers.

This object is achieved with a diffuser of a thermal energy machine, in particular of a gas turbine, with a diffuser inlet, with a diffuser outlet and with a multiplicity of air guiding elements, in which an air mass flow enters the diffuser through the diffuser inlet, and in which the air mass flow that has entered the diffuser leaves the diffuser via the diffuser outlet, and in so doing issues via the air guiding elements as a multiplicity of circumferentially adjacent air mass partial flows, wherein at least two immediately adjacent air guiding elements are configured such that their circumferential component of an outflow angle $\alpha_n$, relative to the circumferential surface formed by the circumferential outlet opening of the diffuser outlet, differ from one another.

Inherent in each of the air guiding elements, due to the shape thereof, is a local outflow angle $\alpha_n$ with which an air mass partial flow generated by the respective air guiding element leaves this air guiding element. Each local outflow angle can be resolved into two different components (which are in turn angles):

A first component, which can be measured by means of a longitudinal section through the diffuser along its longitudinal central axis, gives the inclination of the departing air with respect to the longitudinal central axis: that is to say whether the air departs parallel to the longitudinal central axis or is guided radially further outward or inward.

A second component of the outflow angle, which can be measured by means of a section running perpendicular to the longitudinal central axis of the diffuser, gives the inclination of the departing air with respect to the circumferential direction: that is to say whether the air departs parallel to the circumferential direction of the diffuser outlet (maximum swirl) or departs with less swirl about the longitudinal central axis. In that context, it is immaterial whether the swirl is clockwise or counterclockwise.

In this case, this second component is termed the circumferential component of the outflow angle, and is, according to the invention, different for at least two immediately adjacent air mass partial flows. This is achieved by the relevant air guiding elements being designed accordingly: at least two immediately adjacent air guiding elements of the multiplicity of air guiding elements are configured such that their circumferential component of an outflow angle $\alpha_n$, relative to a circumferential surface formed by the outlet opening of the diffuser outlet, differ from one another.

Specifically, the outflow angles can even be determined for different radial positions of the diffuser outlet. However, if we now consider different components of the outflow angle of adjacent air guiding elements, this comparison assumes that the compared outflow angles of the relevant air guiding elements are determined at the same radius. In that context, the radius is the radial distance between the longitudinal central axis of the diffuser and the relevant point on the trailing edge of the air guiding element.

Hitherto, these outflow angles, which are inherent to the air guiding elements and are measured in relation to the circumferential surface formulated in the sense of the invention, have been identical for all air guiding elements, such that hitherto the air mass partial flows departed with identical swirl irrespective of their circumferential location. In that respect, the air mass partial flows hitherto flowed only in an undifferentiated manner away from the diffuser, such that most of the air mass partial flows were for example conveyed ineffectively to mouth openings of supply ducts of silo combustion chambers.

This drawback in particular is presently resolved or at least greatly diminished.

Use of the invention makes it possible, at different circumferential positions of the diffuser outlet, for the respective air mass partial flows to leave locally at that point with a respective individual swirl, such that the individual air mass partial flows can now be supplied with fewer losses to the mouth openings of supply ducts of silo combustion chambers. For example, those air mass partial flows which have to cover a longer path to the mouth openings can leave the diffuser via appropriately configured air guiding elements and with more swirl than those air mass partial flows which have to cover a shorter path to the mouth openings. This reduces the flow losses between the diffuser outlet and the mouth regions.

The number of adjacent air guiding elements with different circumferential components of the outflow angle can be different here and also depends essentially on the design of the diffuser or the like.

In that regard, it is also possible for just selected air guiding elements to be manipulated in the sense of the invention in order to be able to achieve the effects desired in the present case.

In the sense of the invention, the outflow angles $\alpha_n$ relate to the circumferential surface which is formed by the circumferential outlet opening of the diffuser outlet.

This circumferential surface is in this case defined by the curved outlet opening, of the diffuser outlet, which extends in the circumferential direction of the diffuser.

In the sense of the invention, the term "thermal energy machine" relates essentially to a turbine and in particular to a gas turbine. In that regard, the present text uses the terms "thermal energy machine" and "turbine" synonymously.

In this case, the two immediately adjacent air guiding elements are arranged directly next to one another in the circumferential direction of the diffuser outlet, advantageously at the diffuser outlet of the diffuser, or alternatively immediately behind the diffuser outlet in a diffuser outlet region of a thermal energy machine or of a turbine.

The present air guiding elements can of course be configured differently. For example, one air guiding element has a plate which forms an outflow angle $\alpha_n$ which is advantageous in the sense of the invention.

Such a desired outflow angle $\alpha_n$ can be achieved in a structurally particularly simple manner, for example by means of an appropriately chosen inclination angle of the plate, or of the respective air guiding element, at the diffuser outlet. In this context, it is advantageously possible to use air guiding elements which are identical or have the same configuration, which permits cost-effective production.

In addition or as an alternative, it is also possible to use air guiding elements with differently shaped and oriented air guiding surfaces, in order to be able to achieve or reinforce the present effects. However, this complicates production and installation of the different individual air guiding elements.

In the present case, the number of provided air guiding elements can be chosen almost at will, wherein the outflow angle and/or the inclination angle of the air guiding elements, in particular of at least two immediately adjacent air guiding elements, can be chosen in dependence on the number of air guiding elements arranged at the diffuser outlet.

For example, 48 such air guiding elements are arranged distributed on the circumference of the diffuser outlet.

The present air guiding elements are arranged next to one another in the circumferential direction of the diffuser outlet, and thus also essentially concentrically about a machine longitudinal central axis of a thermal energy machine or of a compressor of the thermal energy machine.

At this point, it should also be noted that the concept of "directly" describes, in the sense of the invention and in relation to the air guiding elements, two air guiding elements which are arranged immediately next to one another and between which there is no other air guiding element. By contrast, the concept of "indirectly" in the present case describes adjacent air guiding elements between which there are arranged one or more air guiding elements.

In any case, the air mass partial flows generated by the multiplicity of air guiding elements can in the present case leave the diffuser outlet with different outflow angles, by means of which all of the generated air mass partial flows can depart more advantageously, in particular with more expedient advantageous directions, for example in the direction of supply ducts of silo combustion chambers or the like that are arranged radially further outward.

In particular, the outflow angles of the air mass partial flows are predefined by the individual air guiding elements such that an accordingly more direct incident flow for the supply ducts takes place.

In that regard, the object of the invention is also achieved with a thermal energy machine, in particular a gas turbine, with a compressor for compressing an air mass flow flowing in the axial flow direction along the machine longitudinal central axis, with a diffuser axially downstream of this compressor, and with two mutually opposite silo combustion chambers that are arranged radially further outward, in which a diffuser outlet region formed by a casing of the thermal energy machine discharges radially into the supply ducts leading to the silo combustion chambers such that the air mass flow leaving the diffuser can flow into the supply ducts via the diffuser outlet region, wherein the thermal energy machine is characterized by the diffuser described here, which can be configured according to one of the combinations of features described here.

This makes it possible for the diffuser outlet on the thermal energy machine, in particular on the gas turbine, to be configured such that, in particular, the supply ducts for the silo combustion chambers can be charged in a more direct and more defined manner with the air mass partial flows.

A thermal energy machine or turbine equipped with the present diffuser can therefore be operated in a substantially more effective manner.

One embodiment variant provides that two immediately adjacent air guiding elements with different inclination angles are arranged inclined with respect to the circumferential surface.

This makes it possible for the air mass partial flows, generated in each case by the air guiding elements which have different inclinations with respect to the circumferential surface, to depart in a more individual manner.

This is also the case when two air guiding elements, arranged immediately adjacent to a common adjacent air guiding element, are arranged at different inclinations with respect to this common immediately adjacent air guiding element.

In this context, the common air guiding element is arranged between the two air guiding elements that are immediately adjacent thereto, with these air guiding elements being positioned next to one another in the circumferential direction of the diffuser outlet.

If the air guiding elements, in particular two immediately adjacent air guiding elements, form different outflow angles relative to the circumferential surface that is defined by the outlet opening, of the diffuser outlet, which runs essentially concentrically about a machine longitudinal central axis of the diffuser, then it is possible to predefine the outflow directions of the air mass partial flows individually in order to achieve the effects desired in the sense of the invention.

The advantageous directions of the air mass partial flows produced by the air guiding elements can depart in an even more precise and effective manner, especially at a diffuser outlet region, if inclination angles of the air guiding elements, chosen in relation to the circumferential surface, are chosen in dependence on their respective circumferential position at the diffuser outlet.

For example, air guiding plates or air guiding elements which are arranged further removed from a mouth opening of a supply duct have a different inclination angle, in particular a more acute inclination angle, than an air guiding plate or air guiding element arranged closer to such a supply duct.

Depending on the configuration of the invention, it can be expedient if the outflow angle $\alpha_n$ and/or the inclination angle of the air guiding elements are smaller, in relation to a circumferential surface formed by an outlet opening of the diffuser outlet, the further the respective air guiding element is arranged from a mouth opening of a supply duct of silo combustion chambers or the like, since this allows the partial outflows to be predefined in a more targeted manner.

It is also advantageous if the outflow angle $\alpha_n$ and/or the inclination angle of adjacent air guiding elements, in particular of two immediately adjacent air guiding elements, are chosen in dependence on a flow outlet angle, formulated by the last compressor stage, of the air mass flow of an upstream compressor.

A blockage of the air mass flow within the diffuser, which might be caused by residual swirl of the air mass flow exiting from the last compressor stage, can advantageously be countered by the outflow angle $\alpha_n$ and/or the inclination angle of the air guiding elements being chosen in dependence on a flow outlet angle, dictated by the last compressor stage, of the air mass flow from the preceding compressor.

Ideally, the air guiding elements mutually opposite one another in the circumferential direction of the diffuser outlet are arranged offset by 180° with respect to one another. It can also be possible to at least significantly reduce or even entirely avoid shear loads, with regard to two silo combustion chamber devices of a gas turbine, if mutually opposite air guiding elements at the diffuser outlet do not have the same outflow angles $\alpha_n$ and/or do not have the same inclination angles.

In that regard, it is advantageous if mutually opposite air guiding elements at the diffuser outlet have mutually different outflow angles $\alpha_n$ and/or mutually different inclination angles.

By individually adapting the outflow angles $\alpha_n$ and/or the inclination angles in the sense of the invention, the air mass flow can be divided more precisely, and thus the combustion in the silo combustion chamber devices can be homogenized.

However, the present invention makes it possible for the air mass partial flows leaving the diffuser outlet to be already quasi-presorted, such that they can flow more effectively in particular through a diffuser outlet region.

Further features, effects and advantages of the present invention will be explained by means of the appended drawing and the following description which illustrate and describe, by way of example, a diffuser with air guiding elements oriented through differently chosen inclination angles, in a thermal energy machine configured as a turbine.

DETAILED DESCRIPTION OF INVENTION

Figure 1:
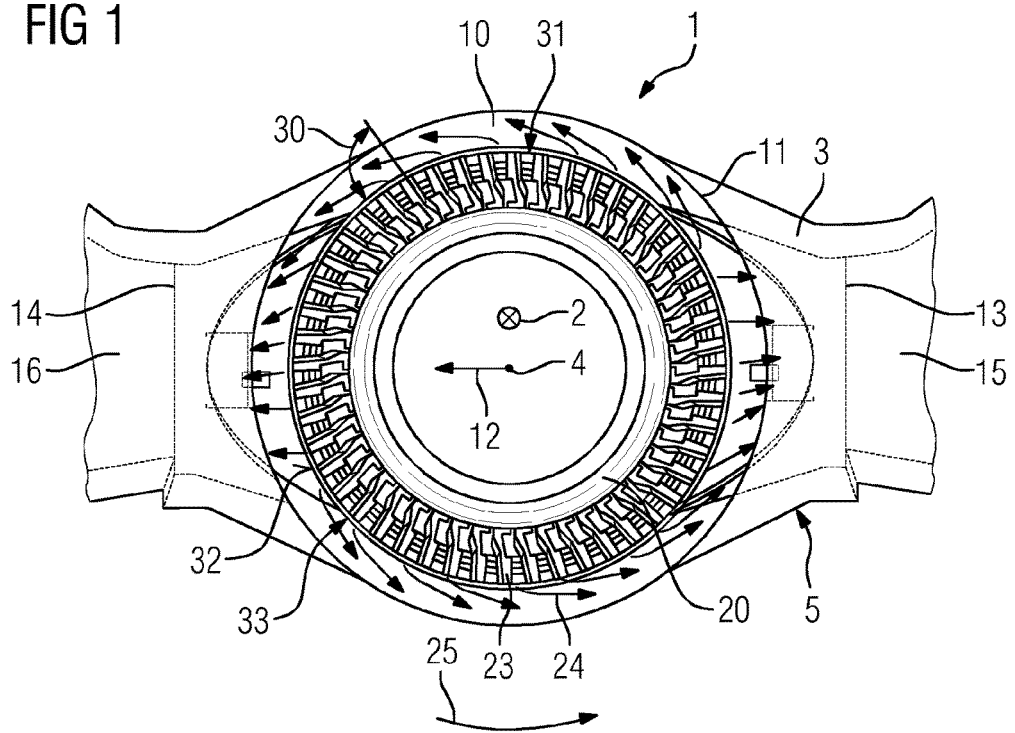
FIG. 1 is a schematic cross-sectional view, taken transversely to a turbine longitudinal central axis, of a diffuser of a turbine.
Figure 2:
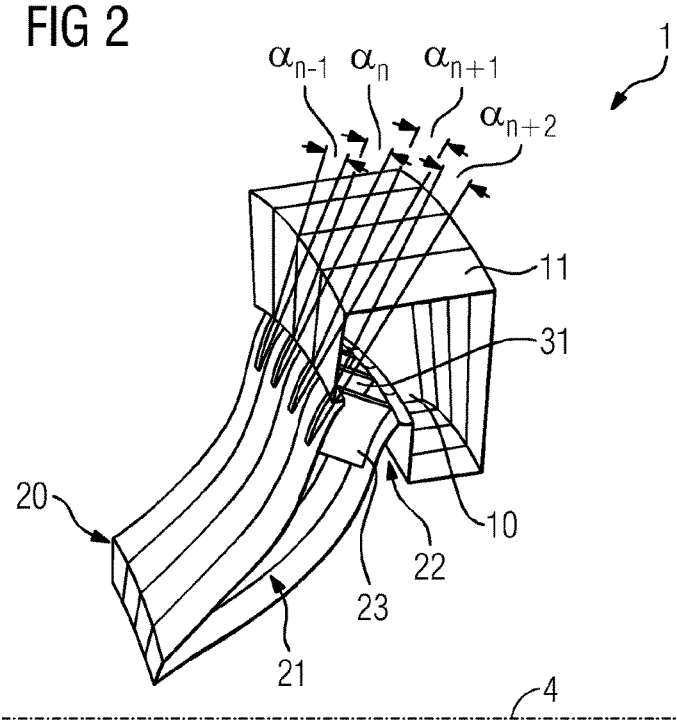
FIG. 2 is a schematic perspective view of part of a diffuser segment of the diffuser shown in FIG. 1.

The diffuser 1 shown at least partially in FIGS. 1 and 2 is arranged downstream of, that is to say after as seen in the axial flow direction 2, a compressor (not shown here) of a thermal energy machine or turbine 3, wherein the axial flow direction 2 coincides with the longitudinal central axis 4.

In this exemplary embodiment, the turbine 3 is a gas turbine 5, wherein the turbine 3 or the gas turbine 5 is also characterized by two silo combustion chamber devices (not shown) which are arranged radially further outward and which each have one silo combustion chamber (not shown).

In this context, a diffuser outlet region 10 formed downstream of the diffuser 1 is formed at least in part by a casing 11 of the turbine 3, wherein this diffuser outlet region 10 opens laterally—and in relation to its longitudinal central axis 4 in the radial direction 12 (indicated only by way of example)—radially outward into in each case one mouth opening 13 or 14 of a supply duct 15 or 16, which each lead to the corresponding silo combustion chamber.

As shown in FIG. 2, the diffuser shown here is a diagonal annular diffuser. In that context, diagonal means that the main flow direction in the diffuser 1 is at approximately 45° to a longitudinal central axis 4 of the diffuser 1. Annular diffuser means that the diffuser outlet region 10 is in the form of an annular gap which concentrically surrounds the longitudinal central axis 4 of the diffuser 1.

As is clear in particular also from the representation of FIG. 2, an air mass flow which flows through the compressor in the axial flow direction 2 (and which is not shown more obviously here) flows through a diffuser inlet 20 into the diffuser 1, flows through a widening diffuser duct 21 of the diffuser 1 and then flows further out of a diffuser outlet 22 and the diffuser outlet region 10 to the mouth openings 13 and 14, wherein the departing air mass flow is divided, in the region of the diffuser outlet 22 and by means of a multiplicity of air guiding elements 23 (here numbered only by way of example), into a corresponding multiplicity of air mass partial flows 24 (numbered only by way of example, see FIG. 1).

The multiplicity of air guiding elements 23 is arranged in the circumferential direction 25 of the diffuser outlet 22, concentrically distributed around the turbine longitudinal central axis 4.

In order that the individual air mass partial flows 24 can depart in a more direct and more optimized manner in the direction of the mouth openings 13 and 14, at least some of the air guiding elements 23, and in particular any two immediately adjacent air guiding elements 23, are arranged inclined with an inclination angle 30 (entered only by way of example) with respect to a circumferential surface 32 defined by the outlet opening 31 of the diffuser outlet 22 such that the individual air mass partial flows 24 can depart in a more direct and more optimized manner in the direction of the mouth openings 13 and 14.

In addition or as an alternative, air guiding elements 23 can also be designed differently such that the individual air mass partial flows 24 can depart in a more direct and more optimized, or even more effective, manner in the direction of the mouth openings 13 and 14. Thus, as can be seen in the depicted exemplary embodiment shown in FIG. 1, those air mass partial flows 24 which flow out at the 3 o'clock and 9 o'clock positions of the diffuser 1 do so with approximately zero swirl. In other words: the circumferential component of the outflow angle of the air mass partial flows, or of the air guiding elements 23 directing these, is small or zero. By contrast, those air mass partial flows which flow out at the 12 o'clock and 6 o'clock positions of the diffuser are provided with more swirl. Accordingly, the circumferential component of the outflow angle of these air mass partial flows, or of the air guiding elements 23 directing these, is rather larger.

Accordingly, in the transition regions, for example at the 2 o'clock position, two air guiding elements 23 which are arranged immediately adjacent to a common adjacent air guiding element 23 are arranged at different inclinations with respect to this common immediately adjacent air guiding element 23, such that advantageously each of the air guiding elements 23 is arranged at a different inclination with respect to the circumferential surface 32.

In that regard, the air guiding elements 23 can generate different outflow angles $\alpha_n$ with respect to the present circumferential surface 32.

Thus, one of the air guiding elements 23 generates an outflow angle $\alpha_n$, with a different outflow angle $\alpha_{n+1}$ being generated by a first immediately adjacent air guiding element 23 and yet another outflow angle $\alpha_{n-1}$ being generated by another indirectly adjacent air guiding element 23. Furthermore, yet another outflow angle $\alpha_{n+2}$ is generated by a first indirectly adjacent air guiding element 23, and so on.

Moreover, the inclination angles 30 of the air guiding elements 23, chosen in relation to the circumferential surface 32, are chosen in dependence on their respective circumferential position 33 at the diffuser outlet 22, whereby the individual air mass partial flows 24 depart in an even more targeted manner in the direction of the mouth openings 13 and 14.

By means of the diffuser 1 described here and integrated in the turbine 2, the air mass partial flows 24 departing from the diffuser outlet 22 can already be particularly well pre-sorted with respect to their flow direction, such that they can depart more effectively toward the mouth openings 13 and, respectively, 14.

Although the invention has been described and illustrated in more detail by way of the preferred exemplary embodiment, the invention is not restricted by this disclosed exemplary embodiment and other variations can be derived herefrom by a person skilled in the art without departing from the scope of protection of the invention.

The invention claimed is:

1. A diffuser of a thermal energy machine, comprising:
a diffuser inlet,
a diffuser outlet disposed axially downstream of and radially outward of the diffuser inlet relative to a machine longitudinal central axis, and
a multiplicity of air guiding elements, wherein
an air mass flow enters the diffuser through the diffuser inlet, and wherein the air mass flow that has entered the diffuser leaves the diffuser via the diffuser outlet, and issues via the multiplicity of air guiding elements, a multiplicity of circumferentially adjacent air mass partial flows, wherein
each air mass partial flow of the multiplicity of circumferentially adjacent air mass partial flows leaves the diffuser at an outflow angle, wherein
each outflow angle is included in a vector that comprises an inclination angle relative to a circumferential surface formed by the diffuser outlet, wherein
least two immediately adjacent air guiding elements of the multiplicity of air guiding elements have respective circumferential positions at the diffuser outlet that differ from one another, and wherein the respective inclination angles of the at least two immediately adjacent air guiding elements, chosen in relation to the circumferential surface, are chosen in dependence on the respective circumferential position at the diffuser outlet and relative to an inlet of a downstream combustor of a gas turbine, and two air guiding elements of the multiplicity of air guiding elements, arranged immediately adjacent to a common adjacent air guiding element, provide different inclination angles with respect to the common immediately adjacent air guiding element.

2. The diffuser as claimed in claim 1, wherein the respective outflow angle of the at least two immediately adjacent air guiding elements are chosen in further dependence on a flow outlet angle of the air mass flow of an upstream compressor of the gas turbine.

3. The diffuser as claimed in claim 1,
wherein mutually opposite air guiding elements of the multiplicity of air guiding elements at the diffuser outlet have mutually different outflow angles.

4. The diffuser as claimed in claim 1,
wherein the diffuser is configured as a diagonal annular diffuser.

5. A thermal energy machine, comprising:
a compressor for compressing an air mass flow flowing in an axial flow direction along the machine longitudinal central axis,
a diffuser as claimed in claim 1 axially downstream of the compressor, and
two mutually opposite silo combustion chambers that are arranged radially further outward,
wherein a diffuser outlet region formed by a casing of the thermal energy machine discharges radially into supply ducts leading to the silo combustion chambers such that the air mass flow leaving the diffuser flows into the supply ducts via the diffuser outlet region.

6. The diffuser as claimed in claim 1, wherein the thermal energy machine comprises the gas turbine.

7. The thermal energy machine as claimed in claim 5, wherein the thermal energy machine comprises the gas turbine.

8. The thermal energy machine as claimed in claim 5, comprising at least four different inclination angles.

9. A thermal energy machine, comprising:
a compressor for compressing an air mass flow flowing in an axial flow direction along the machine longitudinal central axis,
a diffuser as claimed in claim 1 axially downstream of the compressor, and
a silo combustion chamber arranged radially further outward,
wherein a diffuser outlet region formed by a casing of the thermal energy machine discharges radially into a supply duct leading to the silo combustion chamber such that the air mass flow leaving the diffuser flows into the supply duct via the diffuser outlet region.

* * * * *